US006545840B2

(12) United States Patent
Rudi et al.

(10) Patent No.: US 6,545,840 B2
(45) Date of Patent: Apr. 8, 2003

(54) TAPE CARTRIDGE WITH EXPANDABLE HOUSING

(75) Inventors: Guttorm Rudi, Fiellhamar (NO); Joerne Magne Raastad, Oslo (NO)

(73) Assignee: O-Mass AS, Oslo (NO)

( * ) Notice: Subject to any disclaimer, the term of this patent is extended or adjusted under 35 U.S.C. 154(b) by 153 days.

(21) Appl. No.: 09/859,328

(22) Filed: May 16, 2001

(65) Prior Publication Data

US 2002/0171977 A1 Nov. 21, 2002

(51) Int. Cl.$^7$ ................................ G11B 23/02
(52) U.S. Cl. .................... 360/132; 242/347.2
(58) Field of Search .............. 360/132; 242/347, 242/347.2

(56) References Cited

U.S. PATENT DOCUMENTS

| RE29,976 E | * | 4/1979 | Schoettle et al. ........... 360/132 |
| 4,249,710 A | * | 2/1981 | Dobbs et al. ............ 242/347.2 |
| 6,045,079 A | * | 4/2000 | Krula et al. ................ 242/340 |
| 6,267,313 B1 | | 7/2001 | Saliba et al. |

\* cited by examiner

Primary Examiner—Robert S. Tupper
(74) Attorney, Agent, or Firm—Schiff Hardin & Waite (57) ABSTRACT

In a recording tape cartridge, and a drive unit therefor, for extremely wide magnetic recording tape, the recording tape cartridge has a housing containing two tape hubs each rotationally mounted in the housing with the magnetic recording tape wound thereon in respective tape packs, so that the tape can be wound and unwound between the two hubs in a tape transport direction, thereby resulting in an increase in the diameter of the tape pack on one of the hubs. The housing is composed of housing parts which are movable relative to each other in a direction perpendicular to the tape transport direction to expand the housing in the direction perpendicular to the direction of tape transport, to accommodate the increase in the diameter of the tape pack.

23 Claims, 6 Drawing Sheets

TAPE CARTRIDGE WITH EXPANDABLE HOUSING

BACKGROUND OF THE INVENTION

1. Field of the Invention

The present invention is directed to a tape cartridge which contains magnetic recording tape, in particular a cartridge containing an extremely wide tape which allows fast access time to data recorded on the tape, as well as a drive unit for such a tape cartridge.

2. Description of the Prior Art and Related Subject Matter

The use of Magnetic tape as a medium for data recording has the significant advantages of a relatively low cost and a relatively large recording surface area. Nevertheless, conventional magnetic tape has certain disadvantages associated therewith.

A first of these disadvantages is that tape is a sequential medium, which means that when a data transfer head is located at a beginning of a tape, it is necessary for the tape to be transported along its entire length in order to retrieve (or re-write) information at the end of the tape.

A second disadvantage is that, due to the desire and necessity of storing as much data as possible within an available tape area, the data transfer head technology as well as the recording media technology are pushed to their quality limits.

Moreover, many existing drives and cartridges must be designed within specified form factors, in order to satisfy standardization requirements. As an increasing number of functions become available, which are desired to be accommodated in a drive or on a tape, data storage area or other functions must be sacrificed to accommodate the new, additional functions, or some type of compromise must be reached in the overall design.

Among the more important market requirements which are expected in the near future for data storage on tape is that the need for higher storage capacity will continue to increase, at an even faster rate than previously. As discussed below, for example, the storage capacity of a currently available single cartridge is not sufficient for unattended backup during a longer period of time, and therefore so-called autoloader systems have been developed to automatically insert and remove a number of cartridges in a sequence.

Further market requirements are expected to be a need for faster time to access data, a need for an increased data transfer rate, a lower cost per MB (megabyte) and an overall improved quality and reduced cost.

As noted above, the limited data storage capacity of conventional cartridges has resulted in the development of autoloader systems. Conventional autoloader systems, however, are not a satisfactory solution to the problem of storing a large amount of data in an unattended backup procedure over a relatively long period of time. Several disadvantages exist with regard to currently available autoloader systems.

Because such autoloader systems make use of a large number of cartridges, the cartridges are made relatively small, and therefore have a limited space available for use for data storage. Typically, six to ten of such cartridges must be put in a magazine in order to have sufficient storage area (capacity). Because of the relatively small size of the cartridges, the drive is also made small, in order to match standardized form factors. The drive is disposed in a system housing, which also contains robotics, electronics and software needed for loading an unloading the cartridges.

The relatively large number of components, and therefore the relatively high cost, associated with conventional autoloader systems makes the use of such systems an unattractive alternative for a customer who merely wants long term data backup.

To address these problems, a tape cartridge and a drive for extremely wide tape are disclosed in co-pending U.S. application Ser. No. 691,165, filed Oct. 19, 2000, the teachings of which are incorporated herein by reference. The tape cartridge and drive described therein accommodate tape having an extremely wide width, such as a width that is greater than approximately 24 mm, or in a range between approximately 24 mm and approximately 127 mm.

The width of this extremely wide tape, therefore, is greater than that of a conventional magnetic recording tape by a factor of 6 to 10 times. Because the tape has this extremely wide width, the total tape length can be made significantly shorter while still making the same total area available for data storage. Making the tape shorter, however, requires less time for winding and unwinding the tape from the hubs on which it is carried in order to access data at a particular location on the tape.

It is important, however, that the housing for accommodating such extremely wide tape have the same, or substantially the same, form factor as conventional recording cartridges, so as to be accommodated in the openings for conventional tape cartridges in tape drives and auto loaders and magazines. This means that the axes of rotation of the tape hubs in cartridges for accommodating extremely wide tape will proceed parallel to a "longer" dimension of the cartridge housing, rather than perpendicular to the shortest dimension (height) as in a conventional cartridge housing. Given a length of extremely wide tape which is necessary to provide the same total area available for recording data on the tape as a conventionally sized tape, such a length of extremely wide tape can be accommodated in a housing having a height which is comparable to the height of a conventional tape cartridge only when the tape is substantially evenly distributed in respective tape packs on the two hubs in the housing. When any significant amount of extremely wide tape is wound onto one of the hubs, the diameter on the tape pack on that hub increases beyond the standard height of a conventional cartridge housing.

This problem could be addressed by simply providing a lesser length of extremely wide tape in the cartridge, so that even when all of the tape is wound on one tape hub in one tape pack, the diameter of that tape pack still would not exceed the height of a standard tape cartridge.

This would defeat one of the advantages of employing extremely wide tape, however, by decreasing the total area available for recording data.

It therefore remains a problem in the art to provide a tape cartridge which accommodates an amount of extremely wide tape therein having a total area available for data recording which is substantially the same as the area available for data recording in a conventional tape cartridge, and which has a form factor which is substantially the same as the form factor for a conventional tape cartridge.

SUMMARY OF THE INVENTION

It is an object of the present invention to provide a recoding tape cartridge which accommodates a length of extremely wide recording tape having a reduced access time to data in comparison to a conventional recording tape with the same area available for data recording, and which is contained in a tape cartridge having a form factor which is substantially the same as that of a standard tape cartridge.

The above object is achieved in accordance with the principles of the present invention in a recording tape cartridge having a housing with two tape hubs rotatably mounted therein, the tape hubs having magnetic recording tape wound thereon for winding and unwinding between the two hubs in a tape transport direction, and wherein the housing is composed of first and second housing parts which are movable relative to each other in a direction perpendicular to the tape transport direction so as to expand the housing in the direction perpendicular to the tape transport direction to accommodate an increase in diameter of the tape pack on one of the hubs which arises as the extremely wide tape is wound onto that hub.

The inventive recording tape cartridge has a form factor with a low height so that the cartridge can be inserted into the access door opening in conventional tape drives. As an example, the cartridge can have a form factor of four inches by five inches and a height of one inch, which is very similar to single reel cartridges currently in use. The tape surface area will be approximately the same as in such a conventional single reel cartridge, but the length of the extremely wide tape will be reduced approximately by a factor of eight, so that the access time to data on the extremely wide tape is significantly reduced.

In an embodiment, expansion of the relatively movable parts of the housing is accomplished by an expansion mechanism contained in the housing. The expansion mechanism can have gripper portions which are accessible from an exterior of the tape cartridge, which can be gripped by the mechanism which pulls the tape cartridge into a tape drive. Guide channels on opposite sides of the tape drive immediately inside the access door hold the two housing parts together in their initial, low height positions, but once the cartridge has been pulled sufficiently far into the tape drive, the guide channels either cease or expand so as to allow the expansion mechanism, being pulled on by the grippers, to expand the housing parts once the cartridge has cleared the access door.

In a further embodiment, a tape positioning mechanism can also be provided inside the cartridge, having pivotable elements connected to one of the housing parts. As the cartridge is pulled into the drive and the read/write head of the drive is inserted into the cartridge before it expands, the tape positioning mechanism keeps the tape away from the read/write head during insertion thereof, thereby avoiding damage to the tape. When the cartridge clears the access door and is allowed to expand, the tape positioning mechanism then brings the tape into contact with the write/read head, for recording data on the tape or reading data therefrom.

In a further embodiment, the end of the cartridge which proceeds first into the drive has a normally closed door therein, which is hinged to one of the housing parts at one side of the door. The opposite side of the door has small protrusions thereon which engage correspondingly shaped openings in the other housing part. When the door is in the closed position, therefore, it retains the housing parts together by virtue of the protrusions fitting into the openings. As the cartridge is pulled into the drive and the read/write head pushes the door open so that it pivots at its hinge, the protrusions no longer remain in the openings thereby allowing the housing parts to move relative to each other, so that the housing can expand.

DESCRIPTION OF THE PREFERRED EMBODIMENTS

Figure 1:
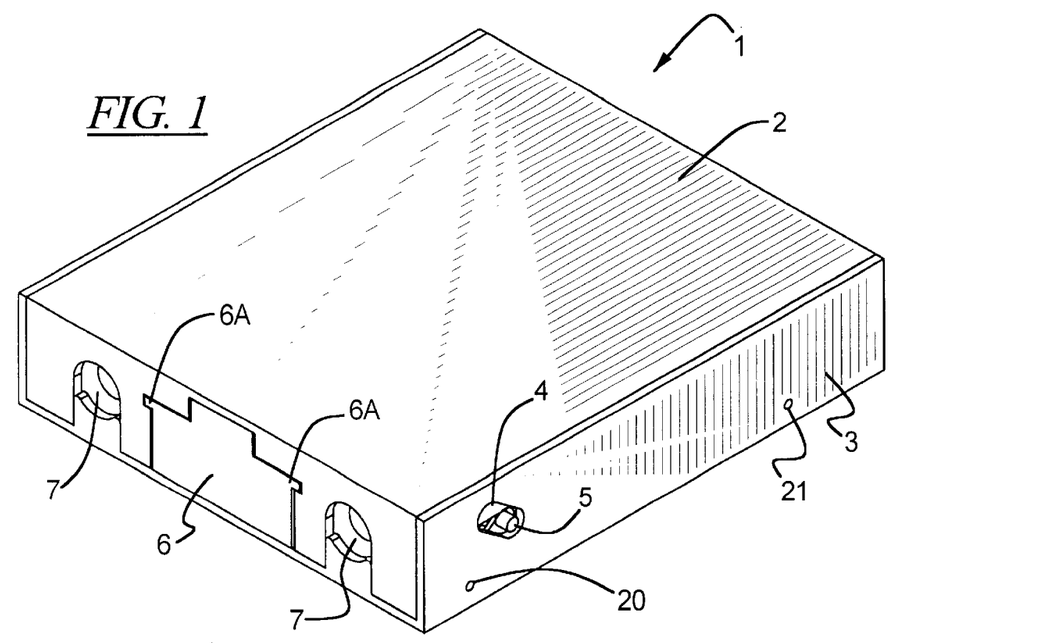
FIG. 1 is an isomeric view of a cartridge for extremely wide tape in accordance with the invention, in the non-expanded state.

FIG. 1 shows the inventive tape cartridge 1 for extremely wide tape in a non-expanded condition. Such extremely wide tape has a width of at least approximately 24 mm, and can as wide as approximately 127 mm. The cartridge one has a housing formed by relatively movable housing parts 2 and 3. The housing parts 2 and 3 are movable relative to each other in the height (i.e. shortest) dimension of the cartridge 1. The lateral sides of the housing parts 2 and 3 have aligned receptacles 4 allowing access to a gripper element 5 of a lifting mechanism contained in the cartridge 1, the structure of which is described below. The cartridge 1 is pulled into a drive unit 29, the structure of which is described below, by a conventional gripping mechanism. When this gripping mechanism engages the receptacles 4 it will simultaneously engage the gripper element 5, thereby activating the lifting mechanism to cause the cartridge 1 to expand to the expanded condition shown in FIG. 2, once the cartridge 1 is free to do so within the drive unit 29. This expansion takes place in the height direction of the cartridge 1, i.e., a direction perpendicular to the direction of tape transport between two tape hubs 10, and perpendicular to the respective rotational axes of the hubs 10.

The cartridge 1 has a front face with a door 6 which is connected by a hinge to the housing part 3. The door 6 is shown in a closed position in FIG. 1. The door 6 has protrusions 6A at opposite sides thereof, which respectively engage correspondingly shaped recesses 2A in the housing part 2. When the door is in the closed position as shown in FIG. 1, therefore, the engagement of the protrusions 6A in the recesses 2A hold the housing parts 2 and 3 in the non-expanded condition.

Figures 9, 10:
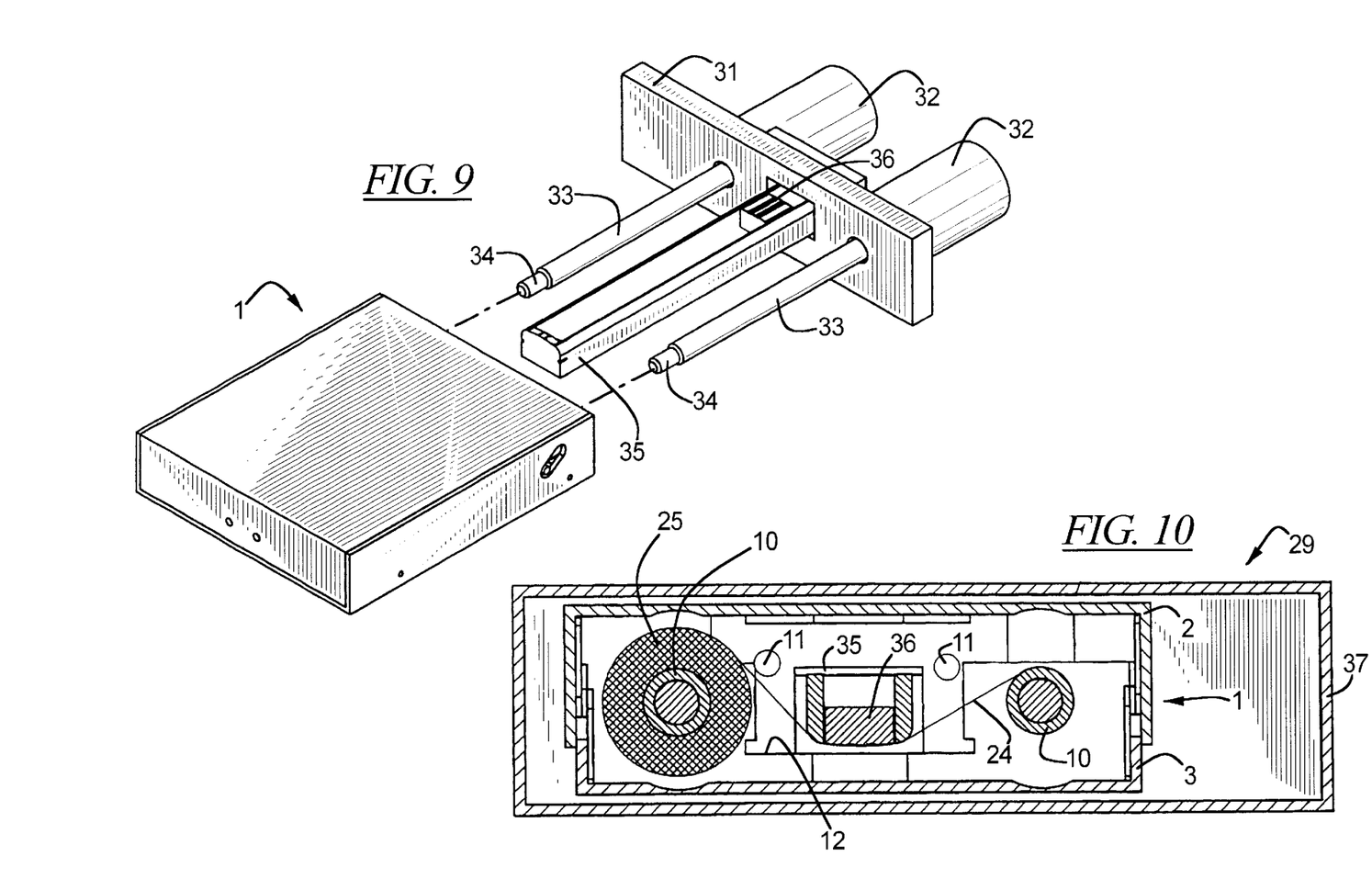
FIG. 9 illustrates the insertion of the internal components in the tape drive into the inventive tape cartridge.
FIG. 10 is a sectional view, taken in a plane through both tape hubs, of the inventive tape cartridge inserted in the tape drive.

When the cartridge 1 is pulled into the drive unit 29 by the gripping mechanism, the end of a head mount 35 (see FIG.

Figure 2:
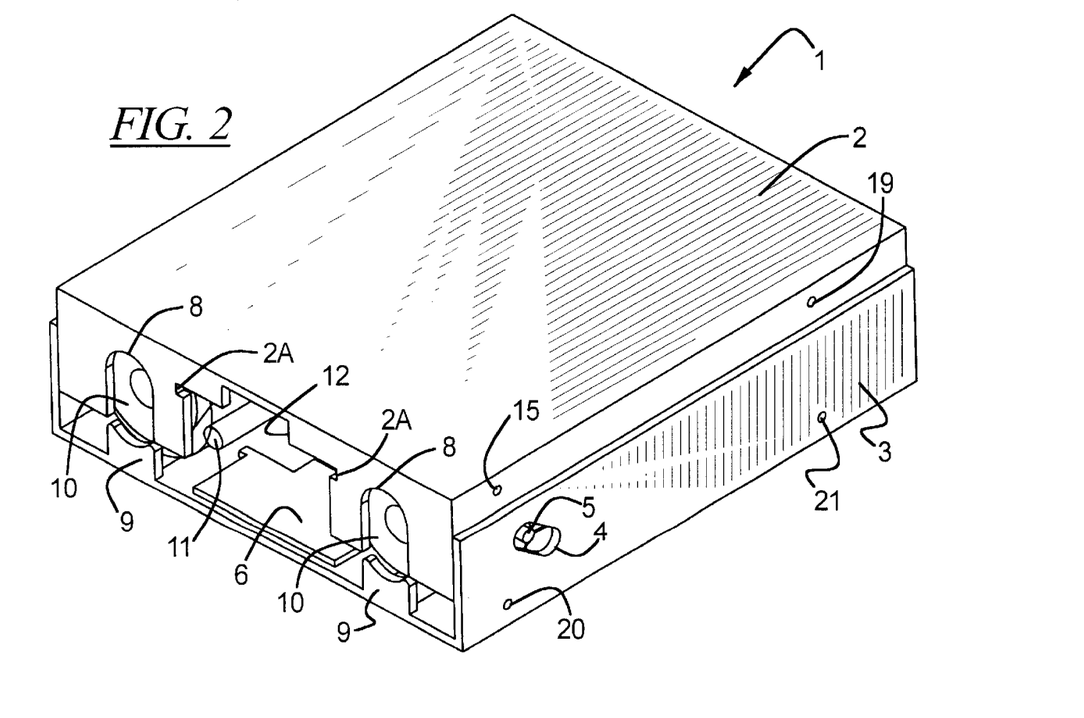
FIG. 2 shows the cartridge in FIG. 1 in the expanded state.

9) pushes against the door 6 causing it to pivot on its hinge, as shown in FIG. 2, thereby releasing the housing parts 2 and 3 and allowing them to expand (when they are not otherwise constrained, as described below).

This end of the cartridge 1 also has openings 7 therein to allow respective drive shafts 33 of drive motors 32 (see FIG. 9) to engage centrally disposed bores in the respective tape hubs 10. Each opening 7 is formed by a U-shaped recess 8 in the housing part 2, and a projection 9, having a concave surface, from the housing part 3.

Figure 3:
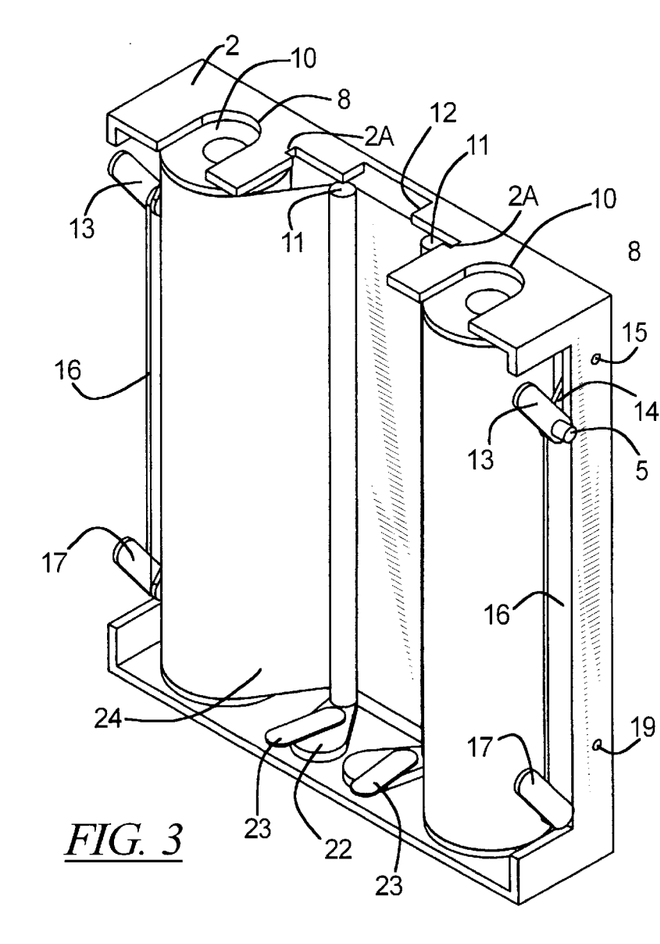
FIG. 3 shows the cartridge of FIG. 1 with one of the housing parts removed, illustrating the positions of the internal components in the non-expanded state.
Figure 4:
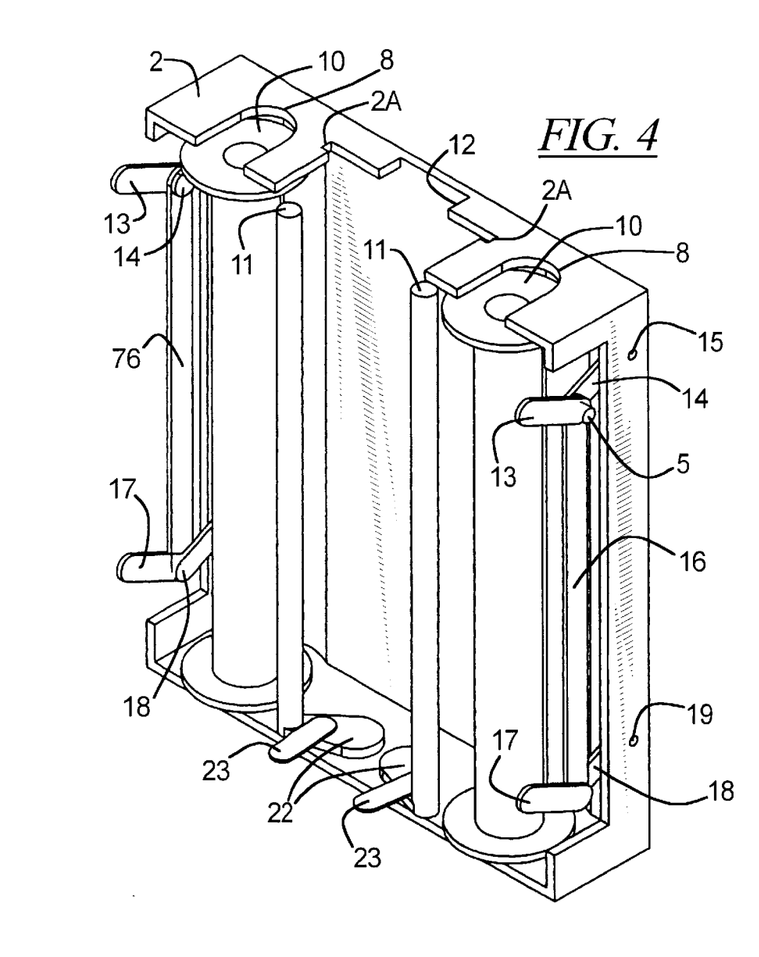
FIG. 4 shows the cartridge of FIG. 2 with one of the housing parts removed, showing the positions of the internal components in the expanded state.

The components of the lifting mechanism in the non-expanded state are shown in FIG. 3, and in the expanded state are shown in FIG. 4. In each of FIGS. 3 and 4, the housing part 3 has been removed to reveal the internal components. In FIG. 3, an extremely wide magnetic recording tape 24 is shown as being wound on the tape hubs 10, but the tape 24 has been omitted for clarity in FIG. 4.

The two lifting mechanisms on the respective lateral sides of the cartridge 1 are mirror symmetric. The aforementioned gripper element 5 in each lifting mechanism is carried on a link 13, which is pivotally mounted to the housing part 3 by a pivot pin 20 (see FIGS. 1 and 2). The link 14 is also pivotably attached to another link 14, with a linking arm 16 therebetween. This arrangement is shown in sectional view in FIGS. 5 and 6. The link 14 is pivotably mounted to the housing part 2 by a pin 15. At the opposite end of the linking arm 16, a link 17 and a link 18 are pivotably attached at opposite sides of the linking arm 16. The link 17 is pivotably mounted to the housing part 2 with a pivot pin 21 (see FIGS. 1 and 2) and the link 18 is pivotably mounted to the housing part 2 by a pin 19.

When the cartridge 1 is in the non-expanded state shown in FIGS. 1 and 3, the links 13 and 14 form a relatively closed V-configuration, as do the links 17 and 18. As the gripping mechanism of the drive unit 29 pulls on each gripper element 5 (which are constrained in their movement range by the size of the respective recesses 4), the links 13 and 14 are caused to move to an open V-configuration, as shown in FIG. 4, as are the links 17 and 18. The housing parts 2 and 3 are thereby moved away from each other by the expansion of the angle between the respective pairs of links. This causes the housing parts 2 and 3 to assume the expanded state in FIG. 2.

The cartridge 1 also includes a tape positioning mechanism, formed by two mirror symmetric arrangements, each having a rod 11, a plate 22, and a link 23. The tape position mechanism serves the purpose of keeping the tape 24 out of the way of the head mount 35 when the head mount 35 is first introduced into the cartridge 1 as the cartridge 1 is being pulled into the drive unit 29 by the gripping mechanism. As best seen in the cross-sections shown in FIGS. 5 and 6, each plate 22 is pivotably mounted, by respective pins 26, to a wall of the housing part 2 which is opposite from the wall containing door opening 12. Each link 23 is pivotably mounted by respective pins 28, to a wall of the housing part 3 at the same end of the cartridge 1. Each link 23 is pivotably connected to a plate 22 by a pin 27.

Figure 5:
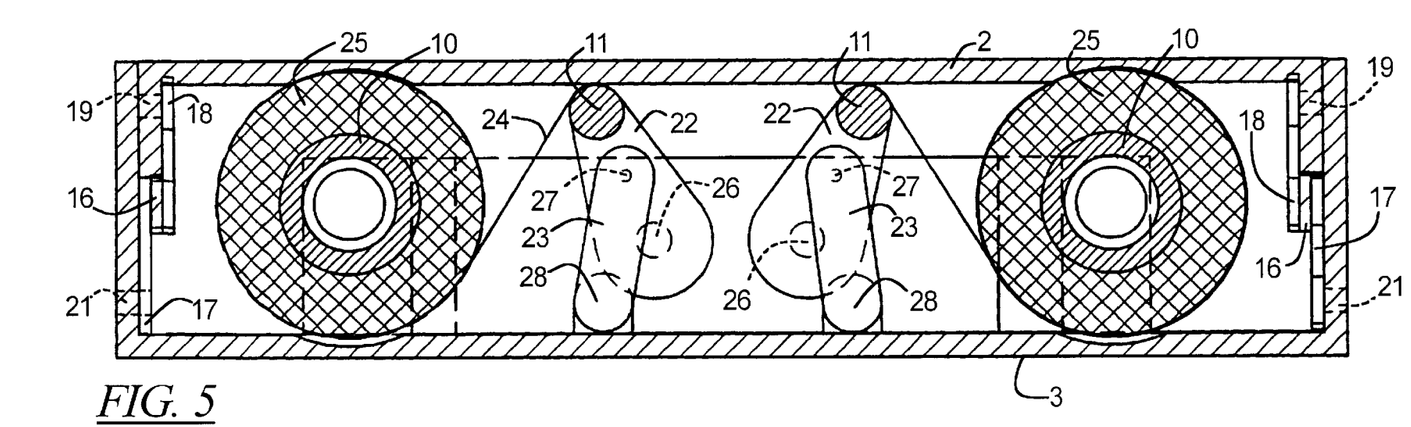
FIG. 5 is a cross-section through the cartridge of FIG. 1 in the non-expanded state.
Figure 6:
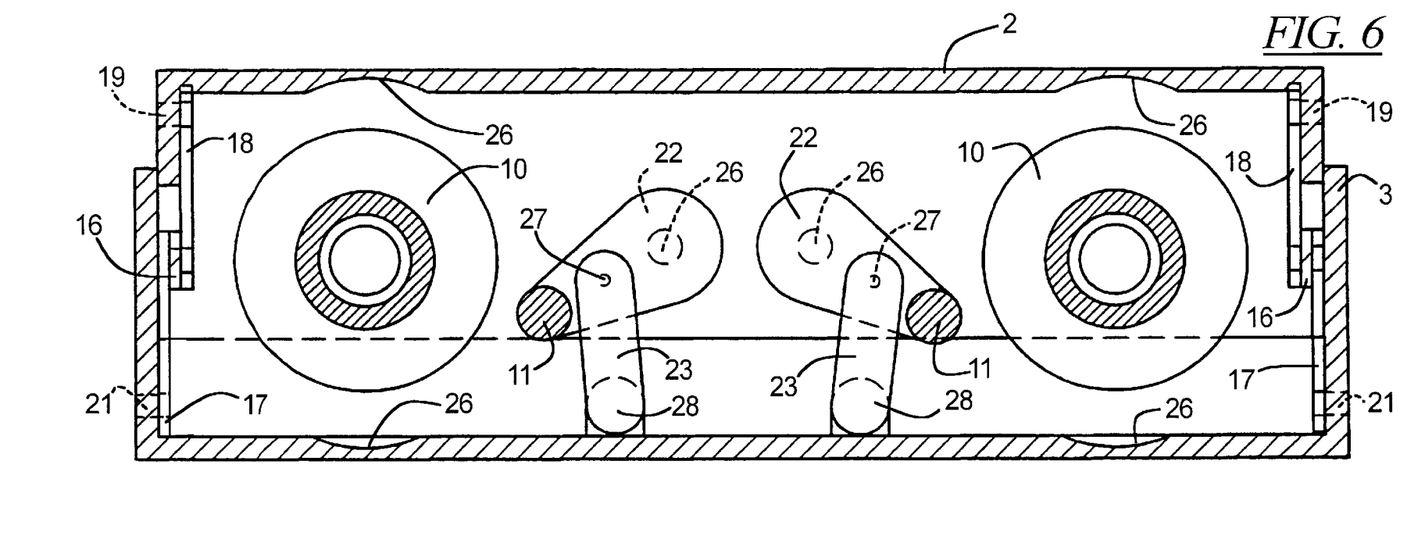
FIG. 6 is a cross-section through the cartridge of FIG. 2 in the expanded state.

When the cartridge 1 is in the non-expanded state shown in FIG. 1, the components of the tape positioning mechanism are in the position shown in FIG. 5, so that the tape 24 is constrained against the housing part 2. After the cartridge 1 has been pulled far enough into the drive unit 29 so that the housing parts 2 and 3 are free to expand, the moving apart of the housing parts 2 and 3 causes the plates 22 to pivot around the respective pins 26, so that the rods 11 are in the position shown in FIG. 6. In FIG. 6, the tape 24 has not been shown, but the dashed and solid line proceeding adjacent to the rods 11 indicates the plane which will be assumed by the tape 24 in the expanded position of FIG. 6.

As can also be seen in FIGS. 5 and 6, when the cartridge 1 is in the non-expanded state, the tape 24 is distributed approximately equally in respective tape packs 25 on the tape hubs 10. The extreme outer portions of these tape packs 25 are accommodated in recesses 26 in the housing parts 2 and 3. Expansion of the housing parts 2 and 3 to the position shown in FIG. 6 (even though no tape is shown therein) allows one of the tape hubs 10 to have substantially all of the tape 24 completely wound thereon, which would result in a significantly increased diameter of the tape pack on the tape hub, which can now be accommodated due to the expanded state shown in FIG. 6.

Figures 7, 11:
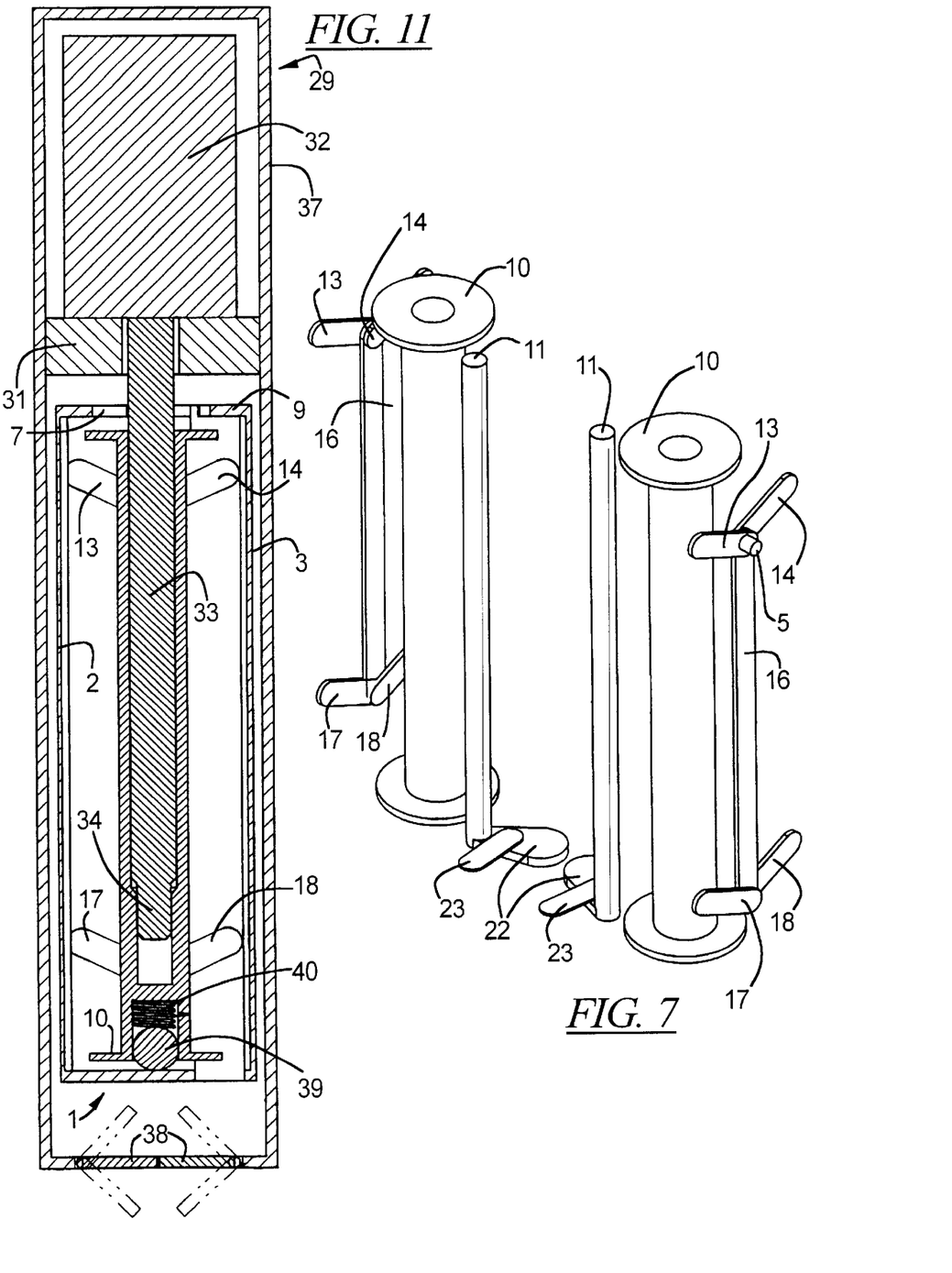
FIG. 7 shows the internal components of the cartridge, with the housing completely removed, showing the positions of the internal components in the expanded state.
FIG. 11 is a sectional view taken longitudinally through one of the tape hubs of the inventive tape cartridge when inserted in the tape drive.

FIG. 7 shows the aforementioned lifting mechanism and tape positioning mechanism, together with the tape hubs 10, without any of the housing parts 2 and 3, so that further details thereof can be ascertained. These components are shown in FIG. 7 in the expanded state.

Figure 8:
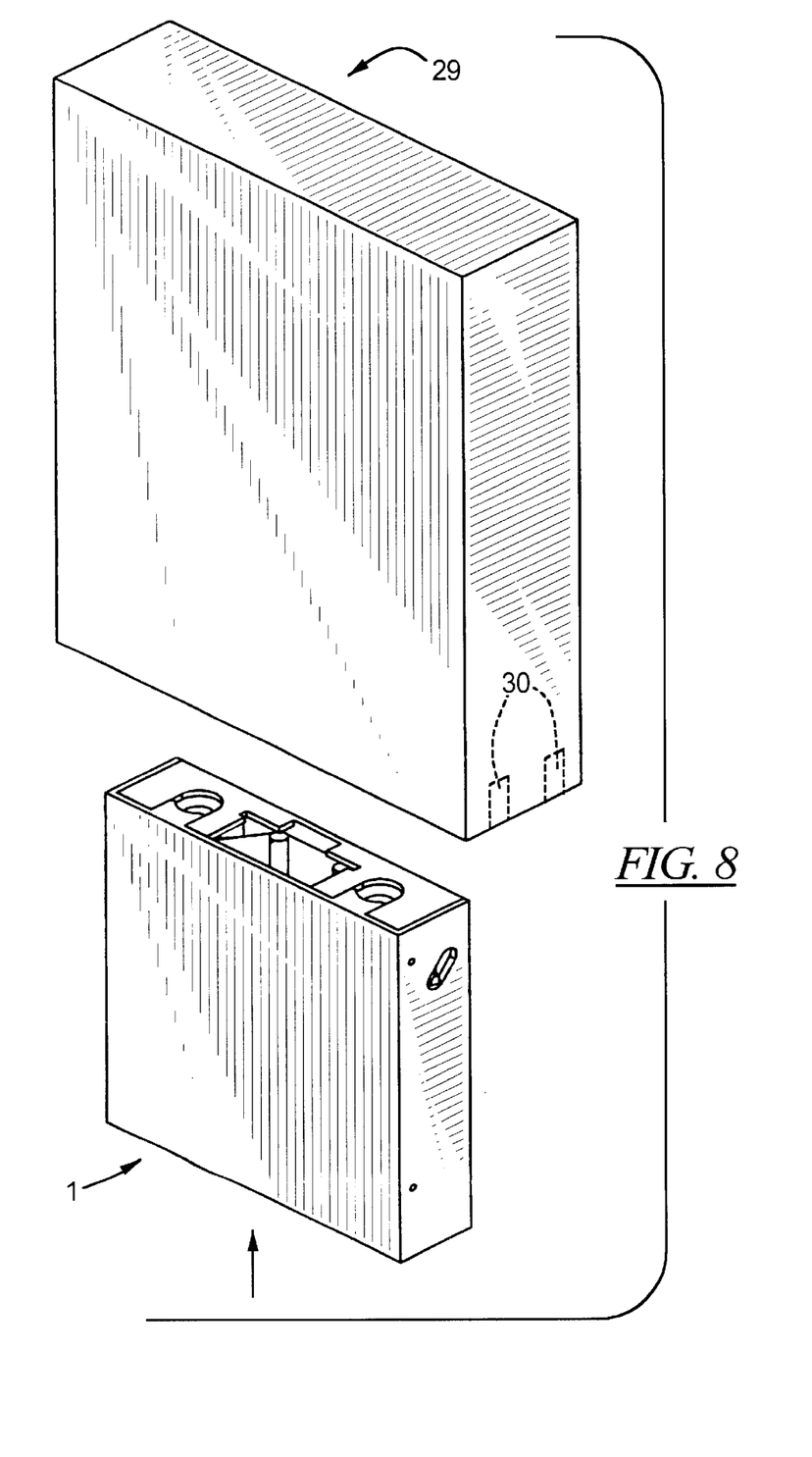
FIG. 8 illustrates the insertion of the inventive tape cartridge into a corresponding tape drive.

FIG. 8 schematically illustrates the insertion of a cartridge 1 into a drive unit 29, in the direction of the arrow. Each interior wall of the drive unit 29 has guide elements 30 which protrude toward the interior of the drive unit 29. When the cartridge 1 is inserted into the drive unit 29, these guides 30 initially prevent the housing parts 2 and 3 from moving apart from each other, even though the gripper mechanism is pulling on the gripper element 5. This is so that the entire cartridge 1 can move through the standard-sized opening in the drive unit 29, which can be seen in sectional view in FIG. 11. Once the cartridge 1 has been pulled far enough into the drive unit 29 so as to clear this opening, the guides 30 no longer constrain expansion of the cartridge 1, and the housing parts 2 and 3 are free to move apart from each other by virtue of the action of the lifting mechanisms, which are still being gripped by the gripping mechanism.

The basic internal components of the drive unit 29 are shown in FIG. 9, wherein the housing 37 (see FIGS. 10 and 11) of the drive unit 29 has been removed. The drive unit 29 has a mounting block 31, to which drive motors 32 are mounted. Each drive motor 32 has a drive shaft 33, which extends through the mounting block 31, and which terminates in a reduced-diameter end 34. The aforementioned head mount 35, to which a read/write head 36 is mounted, is also attached to the mounting block 31.

FIG. 10 shows a sectional view of the cartridge 1 in the drive unit 29, after the cartridge 1 has cleared the guides 30 and therefore has expanded. As can be seen, the read/write head 36 is pressed against the tape 24 so that data can be written onto or read from the tape 24. In FIG. 10, all of the tape 24 is wound in one tape pack 25 on one hub 10, and can be seen that the expansion of the cartridge 1 is more than sufficient to accommodate for the increased diameter of the tape pack 25.

FIG. 11 shows a sectional view through one of the tape hubs 10 with the drive shaft 33 inserted therein. As can be seen, the tape hub 10 has a central bore therein with a shoulder which separates a larger diameter portion from a smaller diameter portion of the bore, so that the drive shaft 33 can be inserted only up to the shoulder in this bore. It can also be seen in FIG. 11 that the tape hub 10 is resiliently mounted in the cartridge 1 so as to allow for rotation thereof. This is accomplished by a wear-resistant ball 39 which is urged against a wall of the cartridge 1 by a spring 40.

As can also be seen in FIG. 11, the drive unit 29, as is standard, has hinged doors 38 which normally close the access opening, and which can be pushed inwardly when the cartridge 1 is inserted, and which can be pushed outwardly when the cartridge 1 is to be removed, as indicated by the phantom lines.

Although modifications and changes may be suggested by those skilled in the art, it is the intention of the inventor to embody within the patent warranted hereon all changes and modifications as reasonably and properly come within the scope of his contribution to the art.

We claim as my invention:

1. A recording tape cartridge comprising:
    a housing;
    two tape hubs each mounted in said housing for rotation around a rotational axis, the respective rotational axes being substantially parallel;
    magnetic recording tape wound in respective tape packs on said two hubs for winding and unwinding between said two hubs in a tape transport direction, thereby resulting in an increase in a diameter of the tape pack wound on one of said hubs; and
    said housing comprising a first housing part and a second housing part which are movable relative to each other in a movement direction which is perpendicular to said tape transport direction and perpendicular to said rotational axes to expand said housing in said movement direction to accommodate said increase in said diameter of said tape pack wound on said one of said hubs.

2. A cartridge as claimed in claim 1 wherein said tape has a width perpendicular to said tape transport direction of at least approximately 24 mm.

3. A cartridge as claimed in claim 1 wherein said tape has a width perpendicular to said tape transport direction in a range between approximately 24 mm and approximately 127 mm.

4. A cartridge as claimed in claim 1 wherein said housing, when not expanded, has a height of approximately 1 inch in said movement direction and a form factor of approximately 4 inches by approximately 5 inches.

5. A cartridge as claimed in claim 1 wherein said first housing part comprises a first planar wall, disposed substantially parallel to said rotational axes, and two first lateral walls each disposed perpendicular to said first planar wall, and wherein said second housing part comprises a second planar wall, disposed substantially parallel to said rotational axes, and two second lateral walls disposed perpendicular to said second planar wall, said first lateral walls fitting inside of, and being adjacent to, said second lateral walls.

6. A cartridge as claimed in claim 5 further comprising a lifting mechanism disposed in said housing and having a gripping element which is accessible from an exterior of said, ho using to operate said lifting mechanism to expand said housing by moving said first and second housing parts away from each other in said movement direction.

7. A cartridge as claimed in claim 6 wherein said lifting mechanism is disposed next to one of said first lateral walls and the second lateral wall adjacent thereto, and wherein said lifting mechanism comprises:
    a first length pivotably mounted to one of said first lateral walls;
    a second length pivotably mounted to said second lateral wall adjacent said one of said lateral walls;
    a linking arm having a first end pivotably connected to said first link and said second link, and having a second end;
    a third length pivotably connected to said one of said first lateral walls and pivotably connected to said second end of said linking arm; and
    a fourth link pivotably connected to said second lateral wall adjacent said one of said first lateral walls, and pivotably connected to said second end of said linking arm; and
    said second lateral wall adjacent said one of said lateral walls having recess therein and said second link having said gripping element attached thereto and projecting into said recess, said first and second links forming a closed V-shape and said third and fourth links forming a closed V-shape when said housing is not expanded, and, upon movement of said gripping element in said recess, said first and second links forming an open V-shape and said third and fourth links forming an open V-shape to move said first and second housing parts away from each other.

8. A cartridge as claimed in claim 7 wherein said lifting mechanism is a first lifting mechanism, and wherein said cartridge further comprises a second lifting mechanism disposed next to the other of said first lateral walls and the second lateral wall adjacent said other of said first lateral walls, said second lifting mechanism being mirror symmetric to said first lifting mechanism, and said second lateral wall adjacent said other of said first lateral walls having a recess therein in which the gripping element of the second lifting mechanism is disposed.

9. A cartridge as claimed in claim 1 wherein said first housing part has a front wall with an access opening therein allowing access to an interior of said housing.

10. A cartridge as claimed in claim 9 further comprising a door connected by a hinge to said second housing part, said door being rotatable on said hinge to open and close said access opening.

11. A cartridge as claimed in claim 10 wherein said door has lateral projections thereon and wherein said access opening has lateral recesses disposed to respectively receive said lateral projections of said door to prevent relative movement of said first and second housing parts when said door is positioned in said access opening.

12. A cartridge as claimed in claim 1 wherein each of said tape hubs has a central bore therein adapted to receive a drive shaft of a drive motor for rotating the respective hubs on said rotational axes, and wherein said first housing part has a front wall with two recesses therein and wherein said second housing part has a front wall, disposed adjacent to said front wall of said first housing part, having two recesses therein, said recesses in said front wall of said first housing part being complementary to, and in registration with, said recesses in said front wall of said second housing part to form two access openings respectively allowing access to said bores in said hubs.

13. A cartridge as claimed in claim 1 further comprising a tape positioning mechanism disposed in said housing and engaging said tape between said hubs to maintain said tape between said hubs close to said first housing part when said housing is not expanded, and to move said tape between said hubs toward said second housing part when said housing is expanded.

14. A cartridge as claimed in claim 13 wherein said first housing part has a first planar wall and a first end wall disposed perpendicular to said first planar wall, and wherein said second housing part has a second planar wall and a second end wall disposed perpendicular to said second planar wall, said first end wall fitting inside of and being adjacent to said second end wall, and wherein said tape positioning mechanism comprises:
    first and second plates spaced from each other and each pivotably mounted to said first end wall between said hubs, each of said first and second plates carrying a rod proceeding substantially parallel to said rotational axes, the respective rods engaging said tape between said hubs; and first and second links spaced from each other and disposed between said hubs, said first and second links each being pivotably mounted at said second end wall, said first link being pivotably connected to said first plate and second link being pivotably connected to said second plate so that when said housing is not expanded, said first and second links force said first and second plates to a position holding said tape on said rods close to said first planar wall, and when said first and second housing parts move relative to each other in said movement direction, said first and second links respectively pivot said first and second plates to move said tape on said rods toward said second planar wall.

15. A recording tape cartridge comprising:

a housing;

two tape hubs each mounted in said housing for rotation around a rotational axis, the respective rotational axes being substantially parallel;

magnetic recording tape wound in respective tape packs on said two hubs for winding and unwinding between said two hubs in a tape transport direction, thereby resulting in an increase in a diameter of the tape pack wound on one of said hubs;

said housing comprising a first housing part and a second housing part which are movable relative to each other in a movement direction which is perpendicular to said tape transport direction and perpendicular to said rotational axes, to expand said housing in said movement direction to accommodate said increase in said diameter of said tape pack wound on said one of said hubs;

said first housing part comprises a first planar wall, disposed substantially parallel to said rotational axes, and two first lateral walls each disposed perpendicular to said first planar wall, and said second housing part having a second planar wall, disposed substantially parallel to said rotational axes, and two second lateral walls disposed perpendicular to said second planar wall, said first lateral walls fitting inside of, and being adjacent to, said second lateral walls;

a lifting mechanism disposed in said housing and having a gripping element which is accessible from an exterior of said housing, via at least one of said second lateral walls, to operate said lifting mechanism to expand said housing by moving said first and second housing parts away from each other in said movement direction; and a tape positioning mechanism disposed in said housing and engaging said tape between said hubs to maintain said tape between said hubs close to said first housing part when said housing is not expanded, and to move said tape between said hubs toward said second housing part when said housing is expanded in said movement direction.

16. A cartridge as claimed in claim 15 wherein said tape has a width perpendicular to said tape transport direction of at least approximately 24 mm.

17. A cartridge as claimed in claim 15 wherein said tape has a width perpendicular to said tape transport direction in a range between approximately 24 mm and approximately 127 mm.

18. A cartridge as claimed in claim 15 wherein said housing, when not expanded, has a height of approximately 1 inch in said movement direction and a form factor of approximately 4 inches by approximately 5 inches.

19. A recording tape cartridge and tape drive combination, comprising:

a tape cartridge having a housing;

two tape hubs each mounted in said housing for rotation around a rotational axis, the respective rotational axes being substantially parallel;

magnetic recording tape wound in respective tape packs on said two hubs for winding and unwinding between said two hubs in a tape transport direction, thereby resulting in an increase in a diameter of the tape pack wound on one of said hubs;

said housing comprising a first housing part and a second housing part which are movable relative to each other in a movement direction which is perpendicular to said tape transport direction and perpendicular to said rotational axes, to expand said housing in said movement direction to accommodate said increase in said diameter of said tape pack wound on said one of said hubs;

said tape drive comprising first and second drive motors respectively having first and second drive shafts which respectively engage said two tape hubs for rotating said two tape hubs around said rotational axes, and a head mount disposed between said first and second drive shafts with a magnetic read/write head mounted on said head mount; and said housing having a end face with first and second access openings therein in registration with said rotational axes for allowing engagement of said first and second drive shafts respectively with said two tape hubs, and a third access opening, between said first and second access openings, for allowing insertion of said head mount into an interior of said housing.

20. The recording tape cartridge and drive unit combination of claim 19 wherein said tape has a width perpendicular to said tape transport direction of at least approximately 24 mm.

21. The recording tape cartridge and drive unit combination of claim 19 wherein said tape has a width perpendicular to said tape transport direction in a range between approximately 24 mm and approximately 127 mm.

22. The recording tape cartridge and drive unit combination of claim 19 wherein said housing, when not expanded, has a height of approximately 1 inch in said movement direction and a form factor of approximately 4 inches by approximately 5 inches.

23. The recording tape cartridge and drive unit combination of claim 19 wherein said drive unit comprises a drive unit housing having a front wall with an access opening therein allowing insertion of said tape cartridge into an interior of said housing, and said housing further comprising lateral walls with guide elements thereon which receive said housing therebetween and prevent expansion of said housing in said movement direction until said housing completely clears said access opening as said cartridge is inserted into said interior of said housing of said drive unit.

* * * * *